Patented July 22, 1952

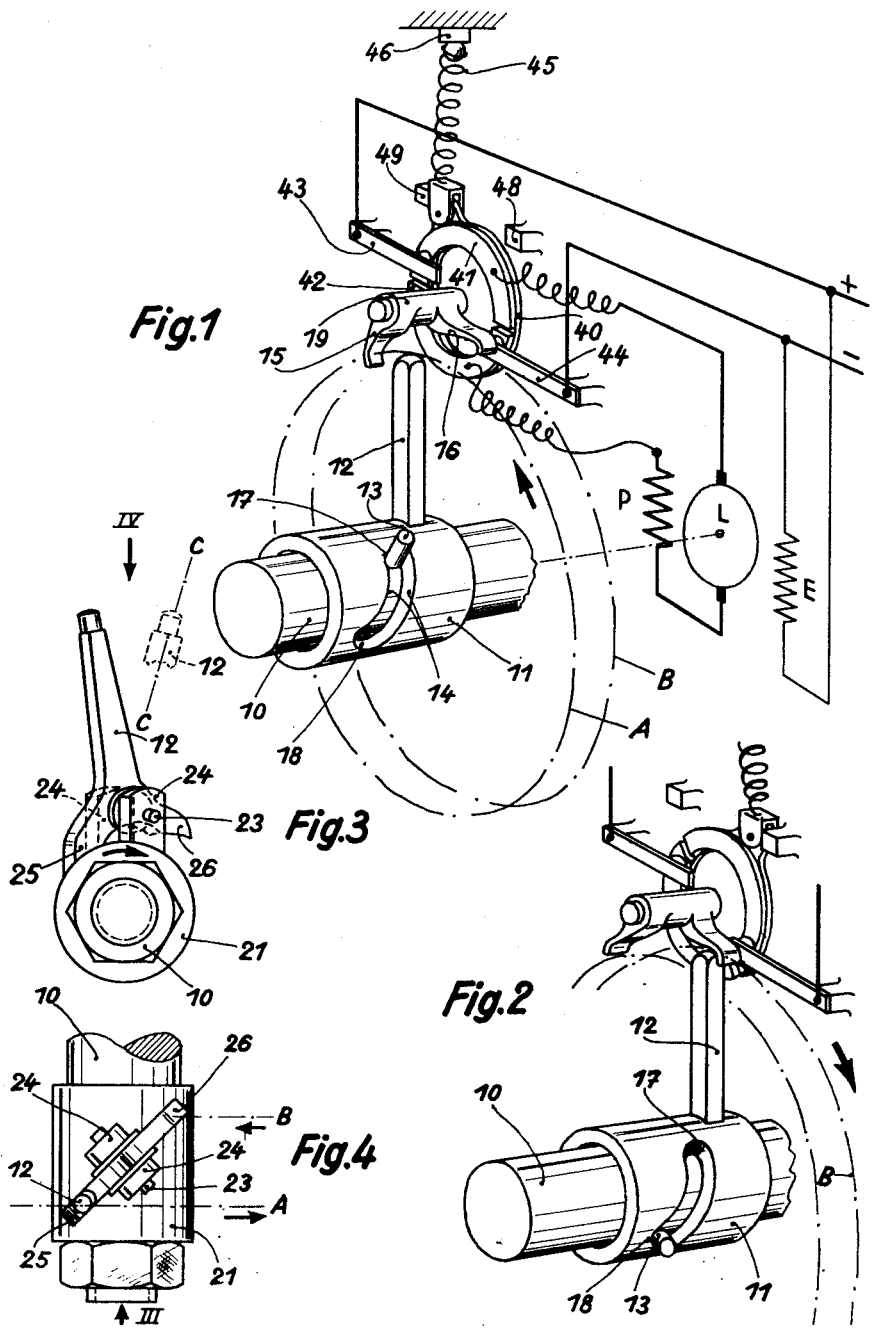

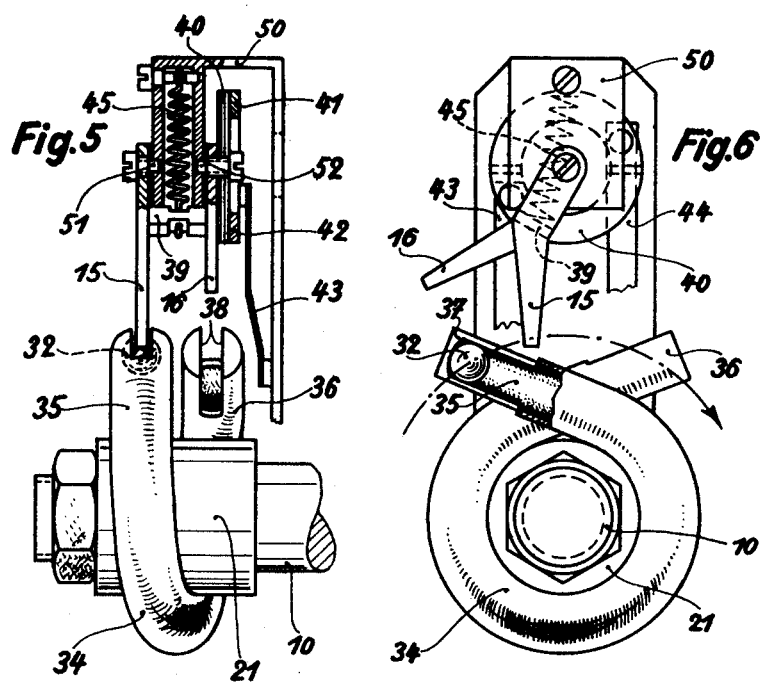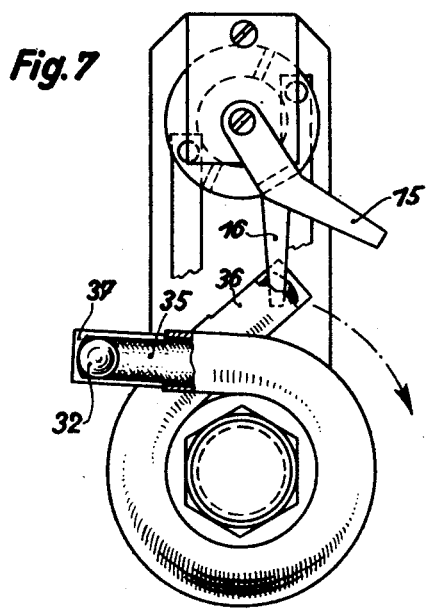

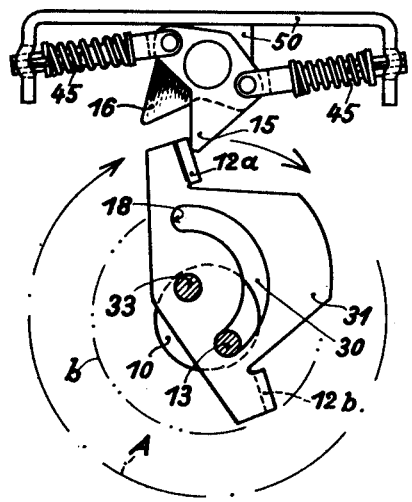
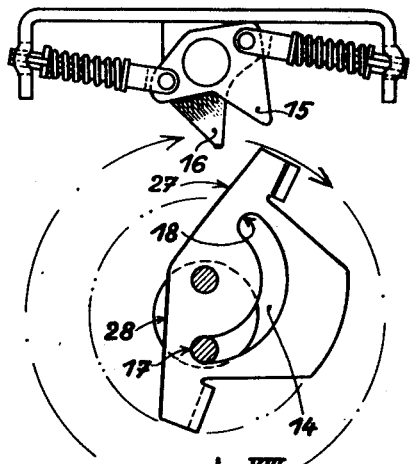
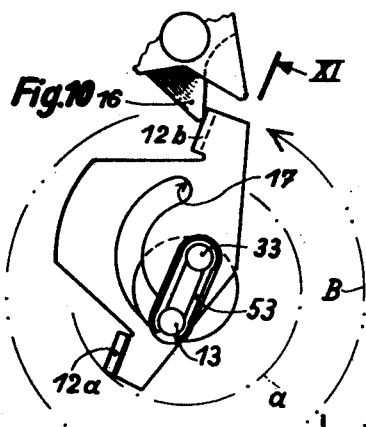
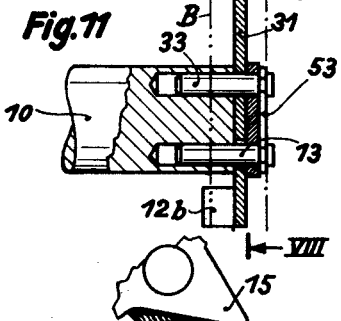
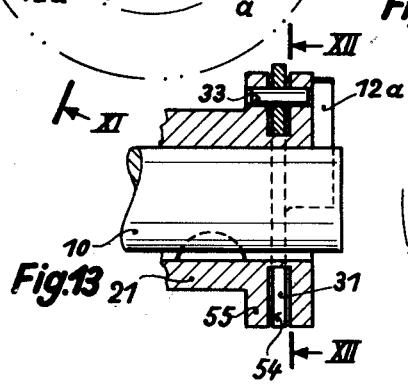
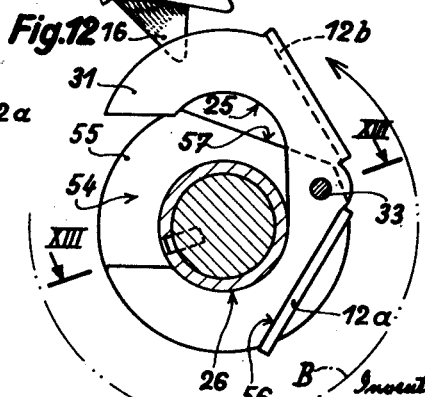

2,604,566

UNITED STATES PATENT OFFICE 2,604,566

SWITCHING MECHANISM

Albert Callsen and Alfred Grözinger, Stuttgart, Germany, assignors to Robert Bosch G. m. b. H., Stuttgart, Germany Application February 3, 1949, Serial No. 74,404
In Germany October 1, 1948

4 Claims. (Cl. 200—153)

This invention relates to a switching mechanism for operation on reversal of the direction of rotation, including a catch provided at the shaft and a switch member to be operated by said catch.

It is the object of the invention to provide a switch gear adapted, e. g., for light dynamos in vehicles with changing direction of motion, in which after release of a switching operation no further wear-causing engagement can take place between the catch and the switch member until a change of the direction of rotation requires another switching operation.

According to the invention this is attained by two switch pawls connected with a switch member and adapted for operation in opposite senses of switching and for alternate swinging into one of two axially displaced paths of rotation of at least one catch member which is mounted on the shaft for limited movement in such a way that it is bound to move into one of the two paths of rotation in case of a start in a clockwise direction, and into the second path of rotation in case of a start in an anti-clockwise direction, for swinging out the pawl associated to the respective path of rotation and swinging the other pawl into the path of rotation which will be passed by it only on reversal of the sense of rotation.

The switching mechanism according to the present invention is characterized by low wear and tear, reliable operation, very simple construction, easy manufacture and small space required for its accommodation.

The invention will be better understood by reference to the following detailed description in connection with the accompanying drawing showing by way of example and schematically some embodiments of the invention and in which:

Figs. 1 and 2 are perspective views of one embodiment of the invention, in two different phases of operation.

Fig. 3 is a partial elevation of a second embodiment, viewed in the direction of arrow III in Fig. 4.

Fig. 4 is an elevation of the same embodiment, viewed in the direction of arrow IV in Fig. 3.

Fig. 5 is a side view of a third embodiment.

Figs. 6 and 7 are front views of the third embodiment, in two different phases of operation.

Figs. 8 to 10 are three end views of a fourth embodiment in different phases of operation or switching positions, Figs. 8 and 9 being sections on line VIII—VIII of Fig. 11, and Fig. 11 is a longitudinal section on line XI—XI in Fig. 10;

Fig. 12 is a cross section of a fifth embodiment, on line XII—XII in Fig. 13, and Fig. 13 is a longitudinal section on line XIII—XIII in Fig. 12.

Similar reference numerals denote similar parts in the different views.

Referring now to the drawings in greater detail, and first to Figs. 1 and 2, showing a perspective view of the first embodiment in connection with a circuit diagram, it will be seen that a sleeve 11 is slidably and rotatably mounted on the shaft 10 of a light generator L having an exciting winding E and a reversing pole winding P. The movability of the sleeve with respect to the shaft is defined by a helical guiding slot 14 arranged in the wall of the sleeve, and by a radial pin 13 projecting into this slot and rotating with the shaft. Provided on the sleeve 11 is a catch 12 which is imparted an anticlockwise rotation along the path of rotation A by the pin 13 engaging the end 17 of slot 14 in the phase of operation shown in Fig. 1. A switch pawl 15 is swingably mounted to project into this path of rotation A and in the course of rotation will be engaged by catch 12 and swung out of the path thereof. As a result of this swinging motion, a second switch pawl 16 connected with pawl 15 moves into an operative position within a second path of rotation B which will be covered by the catch only after a reversal of the direction of rotation, i. e., the catch in this case under action of its own weight or of its own inertia moves the sleeve 11 along the guiding slot 14, until the other end 18 of slot 14 engages pin 13, Fig. 2. In the course of a further starting movement after this reversal of the direction of rotation the switch pawl 16 will now be actuated by catch 12 and swung out of its path B. Thus, pawl 15 again gets into the path A, but there will be no switching operation until another reversal of the direction of rotation takes place.

It will thus be seen that the revolving parts are engaging the elements of the switching device only as long as a switching action is required, i. e., only for a very short period after each reversal of the direction of rotation. As long as the direction of rotation does not change, there will be no frictional contact whatever between the catch and the pawls.

The switch pawls 15 and 16 are connected with each other and with a switch of conventional type by means of a swingable member 19. In the embodiment as shown, the switch indicated generally by 191 comprises an insulating contact plate 40 with two contact segments 41 and 42 engaging two sliding brushes 43 and 44. A quick action spring 45 engaging plate 40 and anchored at a fixed suspension point 46 serves to ensure the switching motions which are limited by two stops 48 and 49. In the position as shown in Fig. 1, the sliding brush 43 is connected with contact segment 41 and brush 44 is connected with segment 42, while in the position as shown in Fig. 2 an electrical connection is established each between the conductors 43 and 42 on the one hand and the conductors 44 and 41 on the other hand. Thus the direction of current in the consumer circuit indicated by marks + and — will remain the same with either direction of rotation of generator L.

In the embodiment shown in Figs. 3 and 4, the catch 12 is mounted to swing about a pivot 23 whose axis is arranged obliquely to shaft 10 and mounted, by means of two fulcrum brackets 24, on a sleeve 21 fixedly seated on shaft 10. Two stops 25 and 26 serve to limit the swinging movement of catch 12 with respect to shaft 10. If the shaft is rotating in a clockwise direction, the stop 25 engages the circumference of sleeve 21 and catch 12 therefore moves along a path of rotation defined by line A. In case of a reversal of the direction of rotation, the catch 12 owing to its inertia swings into the position indicated by dotted lines at C—C in Fig. 3, so that the stop 26 now engages the circumference of sleeve 21 and the catch is caused to rotate on a circular path indicated by line B in Fig. 4. This variation of the position of the catch with respect to shaft 10 may be utilized to operate either of two switch pawls 15 and 16 of the type shown in Figs. 1 and 2.

In the embodiment shown in Figs. 5 to 7, a tube 34 having a helically wound central portion is secured on a sleeve 21 fixedly seated on shaft 10 while its ends form two arms 35 and 36 arranged in parallel planes perpendicularly to the shaft 10 and approximately tangentially to the sleeve 21 and opposed to each other. This tube forms the guiding channel, defined by two stops 37 and 38, for a ball 32 which by its gravity in case of a start in a clockwise direction gets into arm 35 and in case of an anti-clockwise start gets into the arm 36 and with increasing speed is pressed by the centrifugal force against one of the stops 37 or 38, respectively. Each arm 35 and 36 is provided with a slot opening at the end face and having such dimensions that it will pass clear of the respective pawl 15 or 16 which is in its operative position, with its slot embracing the pawl 15, or 16, respectively, provided that ball 32 is not in this slot. The ball 32 forms a catch which when striking against its associated pawl will operate the switch and thereby simultaneously move the second pawl into its operative position within the adjacent path of rotation. Since the ball is not situated in this path at the respective point of time, the associated tube end, bifurcated by the slot, must pass by this switch pawl unhampered, as long as the rotary movement does not change its direction. Since tube 34 is arranged and shaped in such a manner that ball 32 can be only in arm 35 in case of a clockwise rotation of shaft 10, and only in arm 36 in case of an anti-clockwise rotation, the two pawls are bound to be operated always in the right way and in the right order (i. e. the pawl to be operated with anti-clockwise rotation will be operated as the shaft starts running in an anti-clockwise direction after preceding clockwise running and vice versa). The same effect can also be attained by a shape other than the loop-shaped form of tube 34, e. g., by a U-shaped form of this tube. If desired, several balls 32 may be housed in the guide member or in the tube 34 used therefor.

In the embodiment shown in Figs. 5 to 7 the switch pawls 15 and 16 together with a bridge member 39 form a tumbler or rocking switch indicated generally by 391 which is swingably mounted on a frame 50 by means of two short pivots 51 and 52, the insulating carrier 40 of the contact segments 41 and 42 being secured on one of the legs of said rocking switch. A quick-action spring 45 engages the connecting bridge 39 and is anchored at the frame 50.

The fourth embodiment according to Figs. 8 to 11 differs from the preceding ones in that the end of the shaft 10, whose change of direction of rotation is intended to release switching actions, is provided with a pivot 33 which is secured in the shaft eccentrically and parallel to the center axis thereof, a pendulum 31 being hinged to said pivot and guided at the end face of the shaft. A stop pin 13 also secured in the shaft end 10 projects into a recess or slot 30 in the form of a ring segment in this pendulum. By means of a U-shaped spring bow 53 extending into annular grooves of the pivots 13 and 33 after the manner of a chain closing the pendulum 31 is retained at the shaft, while having the required freedom of motion. From the pendulum 31 there are bent off by a punching operation an arm 12a which is turned away from the shaft end 10 and an arm 12b which is turned towards the shaft end. As a result of this arrangement and configuration the pin 13 in case of a right-hand start of shaft 10 engages the end 17 of the recess 30. Therefore, arm 12a describes a large path of rotation A (marked by dot and dash lines in Fig. 8), and in doing so it is bound to swing out the pawl 15 extending into this path. By this action not only the intended switching operation is released, but simultaneously an adjacent pawl 16 associated to the catch arm 12b is swung in (Fig. 9). However, since the catch arm 12b, as long as the direction of rotation remains the same, describes only a small circle b (drawn by double dot and dash lines in Figs. 8 and 9), no further engagement takes place for the time being.

In case of a start in an opposite direction of rotation, on the other hand, the pin 13 engages the end 18 of slot 30. As a result, the catch member 31 is displaced relatively to shaft 10, as shown in Fig. 10, in such a way that arm 12b now describes a large circle of rotation B and thereby in its turn releases the switching operation in an opposite sense as required by the change of rotation, by means of the pawl 16. The pawls 15 and 16 thereby are moved again into the positions shown in Fig. 1, in which a switching operation can be caused only after renewed start of shaft 10 in a clockwise direction, but in which no further switching operation can take place yet as long as the state of movement shown in Fig. 10 continues, since the catch arm 12a still describes the small path of rotation a.

The relative motion between shaft 10 and pendulum 31 required for releasing the switching operation is caused by the mass inertia and by the gravity which is effective temporarily in case of a slow starting motion. As the speed rises, the pendulum owing to the centrifugal force remains in the position reached during the starting motion relative to shaft 10. By way of alternative, the pins 13 and 33 may be secured in the end face of a hub or sleeve adapted to be detachably secured to the front end of shaft 10. The recess or slot 30 may be omitted if two edge portions of the pendulum 31 (see 27 and 28 in Fig. 9) disposed at a suitable distance to each other and to the pivot 33 are used as stop faces for pin 13. In this case, however, either the catch arms 12a and 12b or the pawls 15 and 16 must be interchanged with each other.

In the fifth embodiment as per Figs. 12 and 13, a hub 21 mounted on the shaft end 10 is formed with a collar 55 in which an annular groove 54 is provided. Hinged to a cross pin 33 extending through this annular groove is a U-shaped pendulum 31 punched out of flat material and having two catch arms 12a and 12b bent off therefrom so as to project in opposite directions. The two legs of this pendulum form two stop faces 25 and 26 of which, e. g. face 26 will engage the cylindrical base of groove 54 in case of the left-hand start as shown. As a result arm 12b is swung out of the peripheral face of collar 55, describing the large path of rotation B and swinging pawl 16, which was originally in this path, out of this path, thus releasing the desired switching movement. The pawl 15 thereby swinging into the adjacent path A cannot be engaged yet by the appertaining catch arm 12a during the continuation of the state of rotation just considered, since this arm engages a flattening of collar 55 and thus will project very little from the outer contours of this collar. Only after a change of the direction of rotation, in which the stop face 25 comes to lie against the cylindrical base of groove 54 and the driving arm 12b is swung out, another switching operation can take place, i. e. this time by swinging out pawl 15. This embodiment offers the advantage that the catch 31 is substantially concealed in groove 54. The pawls 15, 16 of the embodiments shown in Figs. 8 to 13 are also connected with switch members which like the switch members of the three first embodiments if required may be replaced by any other control members, to be operated in case of change of the direction of rotation and causing mechanical, pneumatic or hydraulic movements.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described our invention, we claim as new and desire to secure by Letters Patent:

1. A switching mechanism actuated with the reversion of the direction of rotation of a shaft, comprising a carrier having cam ways, means movable between two axially displaced end positions in said cam ways when reversing the movement of said shaft, said carrier consisting of a tube rigidly arranged on the shaft and having two axially displaced arms each provided with a stop, at least one ball arranged in said tube to move freely in said tube, each arm having a slot arranged perpendicularly to the shaft, two switch pawls coaxially arranged for common operation, each adapted to be received in one of said slots and swung out of its operative position by the engagement therewith of the ball.

2. In a switch having angular switch pawls adapted to be actuated upon the reverse rotation of a shaft, an actuating mechanism comprising a tubular guide channel circumposed on the shaft and having axially displaced terminal arms formed at their outer ends with axial slots for receiving the pawls, a member freely disposed in said channel for movement from one terminal to another upon rotation of the shaft and for engagement with said pawls, and stops for the member formed on the arms at the outer ends of the slots.

3. In a switch having angular related and connected switch pawls, actuating means for the pawls including a rotatable shaft, a tube coiled on the shaft and fixed thereto, said tube having oppositely extending free ends disposed tangentially to the shaft and formed with axial transverse slots arranged perpendicularly to the shaft for receiving the pawls, a ball freely disposed in the tube for engaging the pawls upon insertion thereof in the slots, and stops for said ball formed on the ends at the outer ends of the slots.

4. In a switch having angularly related switch pawls coaxially arranged for common operation, a shaft, a tube circumposed on the shaft and having free oppositely extending ends disposed tangentially to the shaft, said ends having axial slots arranged perpendicular to the shaft for receiving the pawls, a plurality of ball elements freely disposed in the tube for movement, upon rotation of the shaft, from one end of the tube to the other and for operative engagement with the pawls, and means on the ends for retaining the ball elements in the tube.

ALBERT CALLSEN.
ALFRED GRÖZINGER.

REFERENCES CITED

The following references are of record in the file of this patent:

UNITED STATES PATENTS

| Number | Name | Date |
| --- | --- | --- |
| 1,247,946 | Fitz | Nov. 27, 1917 |